H. J. BOUDREAUX.
WHEEL.
APPLICATION FILED JUNE 16, 1915.
1,223,140.
Patented Apr. 17, 1917.
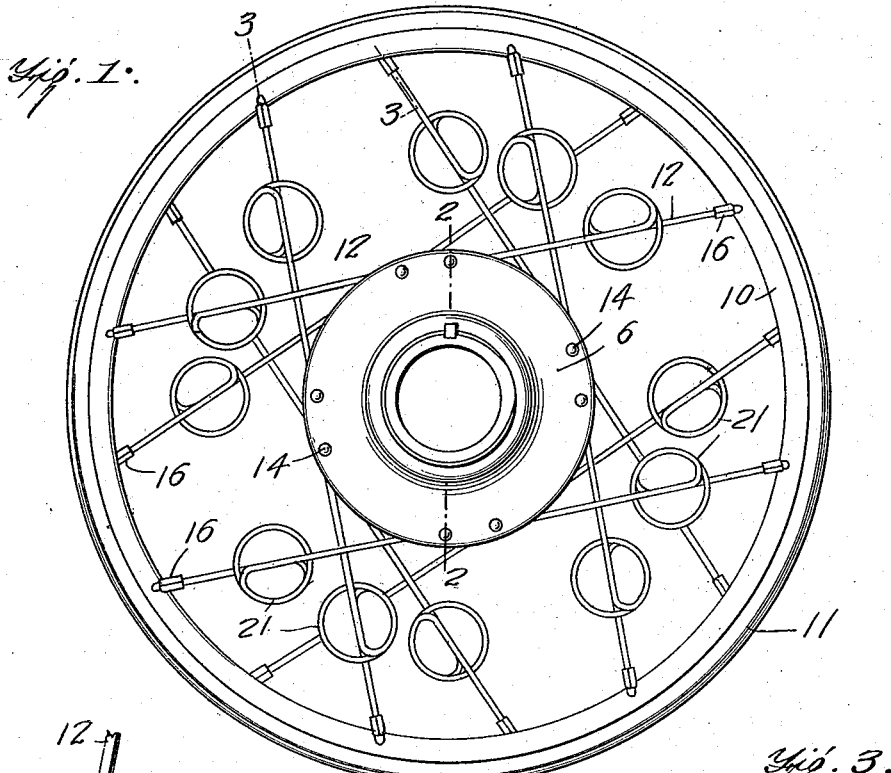
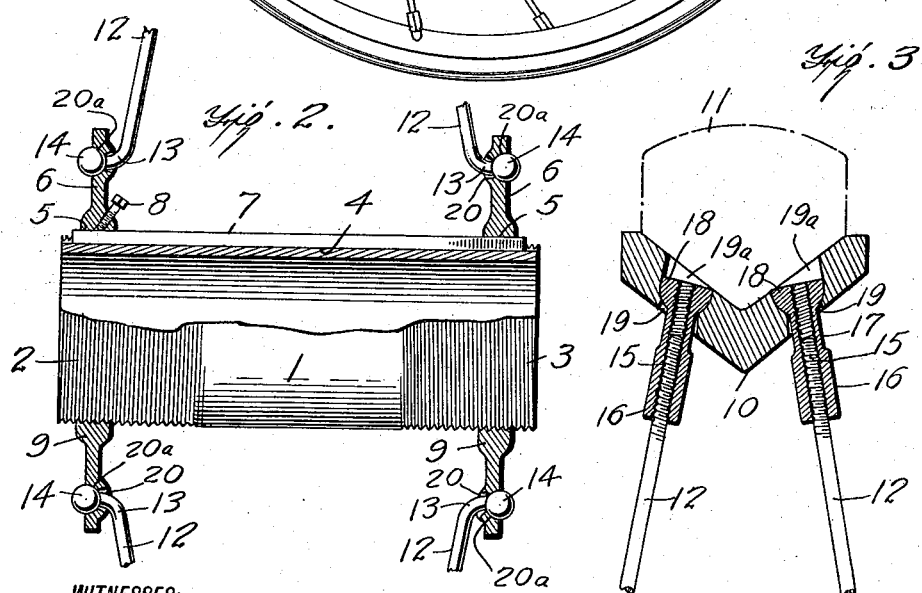
WITNESSES:
INVENTOR
HAMILTON J. BOUDREAUX,
BY
ATTORNEYS

UNITED STATES PATENT OFFICE.

HAMILTON J. BOUDREAUX, OF MORGAN CITY, LOUISIANA, ASSIGNOR OF ONE-HALF TO JOSEPH H. LOEB, OF MORGAN CITY, LOUISIANA.

WHEEL.

1,223,140.  Specification of Letters Patent.  Patented Apr. 17, 1917.

Application filed June 16, 1915. Serial No. 34,410.

*To all whom it may concern:*

Be it known that I, HAMILTON J. BOUDREAUX, a citizen of the United States, and a resident of Morgan City, in the parish of St. Mary and State of Louisiana, have invented a new and useful Improvement in Wheels, of which the following is a specification.

My invention is an improvement in wheels, and the invention has for its object to provide a wheel suitable for use with vehicles of any character but especially adapted for motor vehicles, wherein the wheel is so arranged that shocks and jars imparted to the rim or tire will be neutralized or absorbed and will not be transmitted to the body of the vehicle, the cushioning mechanism being interposed between the hub and the rim in such manner that either compression or tension stress will be counteracted.

In the drawings:—

Figure 1 is a side view of a wheel constructed in accordance with the invention, Fig. 2 is an enlarged detail section of the hub, taken substantially on the line 2—2 of Fig. 1, and Fig. 3 is an enlarged section taken substantially on the line 3—3 of Fig. 1.

The present embodiment of the invention comprises a hub 1 of cylindrical form having its ends externally threaded as indicated at 2, and the threading at the ends is in opposite directions, one end of the hub having a left hand thread and the other end having a right hand thread. The hub is also provided with an external longitudinally extending groove 4 which is designed to register with similar grooves 5 in rings or disks 6, which are threaded on to the ends of the hub.

A key 7 is inserted in the registering grooves 4 and 5, and a set screw 8 is threaded through one of the rings into engagement with the key to prevent displacement thereof. It will be noted that each of the rings 6 has an internally threaded opening of a size to fit the end of the hub, and the said rings are enlarged at the openings on both faces of the ring as indicated at 9.

The rim 10 is an integral structure of angle material in cross section, and of annular form, the said rim consisting of integral portions arranged at an angle with respect to each other. The apex of the angle is inward so that a groove is formed externally.

A solid tire 11 is seated in the groove, the said tire being of rubber or the like, and having its inner surface shaped to fit the groove while its periphery is rounded as shown.

Spokes 12 are provided for connecting the hub and the rim, the said spokes being of wire as shown, and the cushioning mechanism for the wheel is interposed in the length of the spokes. Each spoke is provided at its inner end with an angular portion 13, having a ball 14 at the outer end of the said portion, and the outer end of each spoke is threaded as shown at 15 in Fig. 3.

The threaded end of each spoke is engaged by a sleeve 16, which is internally threaded to fit the spoke, and intermediate its ends each sleeve is externally and annularly reduced as indicated at 17. This reduced portion covers about one third of the length of the sleeve, and the said portion commences at approximately the center of the sleeve and extends toward one end. That is, the reduced portion is nearer one end of the sleeve than the other. At the outer side of the reduced portion at the said end, the sleeve is enlarged to form a substantially semi-spherical head 18. The sleeves 16 are engaged with openings 19 in the rim, each opening extending through one wall of the trough, and each opening is enlarged at its outer end or counterbored as shown at 19ª, to fit the head 18 of the adjacent sleeve.

The spokes are arranged in series, one series at each face of the wheel, and each spoke is passed through an opening 20 in the adjacent ring 6 from without inward, the ball 14 being at the outer face of the ring. Each of the openings 20 is counterbored at its outer end as indicated at 20ª to fit the ball of the adjacent spoke, and the inner end of each opening is tapering, being gradually enlarged from within outward to permit movement of the angular portion 13 of the spoke in the opening. The balls 14 are thus on the outer faces of the rings 6, and the spokes are arranged approximately tangentially to the rings.

In placing the spokes, they may be threaded through the openings 20—20ª from without inward until the head 14 of each of the spokes engages the counterbored portion of the opening, after which the coil 21 may be formed, or the angular portion 13 of the spoke may be passed through the opening 20—20ª, when the coils have been already formed and the head 14 formed after the entrance of the portion 13.

A sleeve 16 is passed through that opening 19 of the rim to which the spoke is to be connected, the sleeve being passed from without inward, and the head 18 of the sleeve by its engagement with the opening limits the inward movement of the sleeve.

The threaded end of the spoke is now engaged with the inner end of the sleeve, and the sleeve is turned until the spoke is tightened. The main portion of each sleeve 16 has its periphery polygonal in cross section as shown in Fig. 1, to permit the engagement of a wrench to turn the sleeve, and it will be obvious that the spokes may be tightened to any desired degree of tension by turning the sleeves in the proper direction.

It will be noted from an inspection of Fig. 1, that the spokes of each series are arranged in pairs, and the members of each pair are in approximate alinement. Referring to the upper portion of the wheel, it will be noticed that two spokes 12 extend outwardly from the near ring 6 in opposite directions toward the rim 10, and the spokes are connected with the rim at almost directly opposite points.

At the lower part of the figure another pair of spokes is arranged approximately parallel with the first-named pair, and at each side of the ring a pair of spokes is arranged in approximately vertical position. The spokes of the other series, that is, at the other side of the wheel are arranged slightly in rear of the spokes at the near side of the wheel. In other words the spokes of one series are arranged slightly in advance of the corresponding spokes of the other series.

The cushioning mechanism is as before stated, interposed in the length of the spokes, each spoke having a species of coils 21 intermediate its ends formed from the material of the spoke by bending the spoke into the proper form. Each of the coils or cushions consists of a complete circle and a half circle.

In forming the coil, the spoke is bent upon itself to form a circle, and it is then bent to form the half circle and the ends of the spoke extend in parallelism, with the diameter portions of the circle and half circle parallel and in register. That portion of each spoke on the inner side of the coil is slightly longer than the portion on the outer side and because of the fact that the spokes are tangential to the rings, each coil will have its center in a line almost exactly half way between the perimeter of the adjacent ring and the rim.

Since the coils are similarly situated in all of the spokes, the coils of each series of spokes will have their centers in the same circle coaxial with the wheel. When the wheel is in use, and the rim or tread meets with an obstruction the hub will be forced toward the rim or the rim will be forced upward with respect to the hub, and practically all of the spokes will be subjected to tension stress because of the tangential arrangement of the spokes.

Whatever the position of the wheel there will be two spokes at each side extending upward from the hub to the rim, and two extending downwardly from the hub to the rim. The two downwardly extending spokes will be subjected to compression stress, while those above will be subjected to tension stress. The laterally extending spokes will all be subjected to tension stress.

Whatever stress is brought to bear upon the spokes the tendency will be to deform the coils, and the natural resiliency of the spoke material tending to return the coils to normal position and to hold them in normal position, will absorb the shock and jar, so that it will not be transmitted to the body of the vehicle.

Should for any reason a spoke become loosened, it may be tightened by means of the sleeve 16, and should a spoke become broken or injured it may be easily replaced merely by unthreading the sleeve 16, removing the spoke and replacing it with a new one.

The improved wheel may be of any desired size, and the size of the spokes will depend upon the conditions under which the wheel is to be used, and will also depend upon the size of the wheel. The hub may be of any desired length and of any desired bore. The spokes may be made of material having any desired cross section, as for instance, flat or square or of other polygonal cross section instead of round as shown. While a complete circle and a half circle constitute each coil in the present instance, it will be obvious that this arrangement might be varied from in accordance with conditions.

The particular manner of connecting the spokes to the hub and the rim will depend upon conditions, the present manner being shown as a desirable method of connecting the parts. Because of the threaded connection between the rings 6 and the hub, these rings may be adjusted toward or from each other, and whatever position they may finally take they may be locked from rotation by the key and the set screw.

The invention in its simplest form is a wheel, comprising a hub and a rim, the rim having flanges or ribs at its ends, namely, the elements 6, together with the plurality of series of spokes connecting the hub to the rim, each spoke having interposed in the length thereof a cushion for the purpose specified.

I claim:—

In a wheel, the combination with a hub and a rim, of spokes connecting said hub to the rim, each spoke having intermediate its ends resilient cushioning mechanism for cushioning the hub against the rim, the spokes being tangential to the hub and being arranged in series, one series at each face of the wheel, and the members of each series being in pairs and the members of each pair extending in opposite directions, and the arrangement at the opposite faces of the wheel being similar and with the spokes at one face in advance of the corresponding spokes at the other face, said hub having at each end a flange adjustable angularly of the hub and to which the adjacent series of spokes is connected, and a tensioning device connecting each spoke to the rim, each of said devices comprising a sleeve into which the spoke is threaded, each sleeve having at its outer end a head whose inner surface is rounded, the rim having an opening for receiving the head and reduced at its inner end to provide a hold for the head.

HAMILTON J. BOUDREAUX.

Copies of this patent may be obtained for five cents each, by addressing the "Commissioner of Patents, Washington, D. C."